US008442874B2

(12) United States Patent  
Moorhead

(10) Patent No.: US 8,442,874 B2  
(45) Date of Patent: May 14, 2013

(54) FLIGHT SELECTION METHOD

(75) Inventor: Scott Moorhead, Milton (AU)

(73) Assignee: Standby Holdings Pty Ltd, Queensland (AU)

( * ) Notice: Subject to any disclaimer, the term of this patent is extended or adjusted under 35 U.S.C. 154(b) by 0 days.

(21) Appl. No.: 13/143,037

(22) PCT Filed: Jan. 19, 2010

(86) PCT No.: PCT/AU2010/000041
§ 371 (c)(1),
(2), (4) Date: Jun. 30, 2011

(87) PCT Pub. No.: WO2010/083553
PCT Pub. Date: Jul. 29, 2010

(65) Prior Publication Data
US 2011/0270715 A1    Nov. 3, 2011

(30) Foreign Application Priority Data

Jan. 20, 2009 (AU) .................................. 2009900208  
Jan. 22, 2009 (AU) .................................. 2009200253  
Sep. 29, 2009 (AU) .................................. 2009100985

(51) Int. Cl.
*G06Q 30/00* (2012.01)

(52) U.S. Cl.
USPC ........................................ 705/27.1; 705/26.1

(58) Field of Classification Search .................... 705/26, 705/27, 26.1, 27.1
See application file for complete search history.

(56) References Cited

U.S. PATENT DOCUMENTS 6,353,794 B1   3/2002   Davis et al.
2010/0121660 A1*   5/2010   Boykin .............................. 705/5

FOREIGN PATENT DOCUMENTS

NZ           546427          7/2009
NZ           553606          7/2009

OTHER PUBLICATIONS

International Search Report, dated Feb. 24, 2010, corresponding to PCT/AU2010/000041, 4 pages.
Examination Report of New Zealand Patent Application 584321, dated Jun. 11, 2010, 2 pages.
Air New Zealand website <http://www.airnewzealand.co.nz> (Internet Archive Wayback Machine on Jul. 29, 2008) 4 pages.
Au et al. 'Searching for Airline Tickets: A Comparison of Tabular and Graphical Presentations', SHORE 2001, University of Maryland. Retrieved from <http://web.archive.org/web/20010520205624/http://www.otal.umd.edu/SHORE2001/airline/index. html> published on May 12, 2001 as per Wayback Engine, 4 pages.
Shapiro et al. 'FareBrowser: An Interactive Visualization Tool for Finding Low Airline Fares', Project report for CMSC 828s/838s at the University of Maryland, College Park, Nov. 30, 1999. Retrieved from <http://www.cs.umd.edu/hcil/academics/courses/fal11999/cmsc838s/Project/billshap/> on Feb. 16, 2010, 41 pages.
Casner, 'A Task-Analytic Approach to the Automated Design of Graphic Presentations', ACM Transactions on Graphics, vol. 10, No. 2, Apr. 1991, pp. 111-151.

* cited by examiner

*Primary Examiner* — Courtney Stopp
(74) *Attorney, Agent, or Firm* — Christie, Parker & Hale, LLP

(57) ABSTRACT

The present invention relates to a flight selection method using a computerized device. The method includes the step of processing flight data relating to flights to produce display data. The display data is displayed by a remote computer in accordance with a flight search query. The display data includes flight representations displayed relative to a timeline. At least one flight representation is associated with more than one fare indicator to provide for a more compact display of flight information.

12 Claims, 7 Drawing Sheets

FLIGHT SELECTION METHOD

CROSS-REFERENCE TO RELATED APPLICATION(S)

This application is a National Phase Patent Application and claims the priority of International Application Number PCT/AU2010/000041, filed on Jan. 19, 2010, which claims priority of Australian Patent Application Number 2009900208, filed on Jan. 20, 2009, Australian Patent Application Number 2009200253, filed on Jan. 22, 2009, and Australian Patent Application Number 2009100985, filed on Sep. 29, 2009.

TECHNICAL FIELD

The invention generally relates to a method for flight selection. The present invention has particular, although not exclusive application to searching for, selecting and purchasing flight tickets from flight providers with remote customer computers by means of the Internet.

BACKGROUND

The reference to any prior art in this specification is not, and should not be taken as an acknowledgement or any form of suggestion that the prior art forms part of the common general knowledge.

When comparing air-travel options online, customers seeking to purchase flight tickets are often faced with two choices. The first option is for the customer to browse the Internet to each of the airline's sites individually and later follow-up on the best option. The second option is to use a comparison service that lists the fares and schedules of several airlines in one location.

The first of these methods takes longer and requires the user to keep their own tally of options in order to determine and then follow-up on the best candidate.

For the second option, the comparison-table option typically presents a grid of fares, with departure times for individual flights on one axis, and flight providers and fare types on another axis. An example of a known comparison-table webpage available at www.webjet.com.au is shown in FIG. 1. Fare values are shown on the chart at the corresponding flight class and time coordinates. On popular city-to-city routes, even with only two or three airlines conducting services, these comparison-tables can be very large. The number of rows in the table is dictated by the number of individual flights (e.g. 50 rows for a typical mid-week Brisbane to Sydney table showing fares for the three main airlines that fly that route). Airlines also often offer multiple flight classes (economy, premium economy, business, first class etc). In turn, each flight class can be divided into multiple fare types (e.g. Supersaver, SupersaverPlus, etc.) for that class which can further add to the complexity of comparison tables through the introduction of additional columns or rows for each fare class or type. The table typically displays hundreds of cells containing prices and the size of the table often means that they can't be displayed in full on one screen or page. Scrolling through the tables on-screen can leave the user lost in a grid of fares where the column and row labels can no longer be seen. As air traffic increases, and more airlines fly each route offering an increased number of fare options, the tables will become larger and more difficult to read. Their effectiveness as a comparison tool will further diminish.

SUMMARY OF THE INVENTION

According to a first aspect of the present invention, there is provided a flight selection method using a computerised device, the method including the step of processing flight data relating to flights to produce display data, the display data for displaying by a remote computer in accordance with a flight search query, the display data including flight representations displayed relative to a timeline, at least one flight representation being associated with more than one fare indicator.

The flight representations may be arranged in horizontal rows with each row including multiple flight representations. A connection indicator may be displayed between two adjacent flight representations in a row to indicate a connecting flight. The length of the connection indicator may correspond to the time between adjacent flight representations and, when a mouse pointer is located in register with a later one of said adjacent flight representations, the starting location corresponding to the later flight representation may be displayed.

Each displayed flight representation may be interactive so that a flight selection and an associated fare can be selected using a mouse or other input device. Selecting the flight selection and associated fare may involve displaying a fare option box when a mouse pointer is located in register with a flight representation. The fare option box may include selection buttons corresponding to respective fares and the flight selection may be made when a selection button is selected. The method may further involve displaying only the flight representation corresponding to the made flight selection.

The fare indicators may be arranged in a row of ascending values. The display data may include a chart, the chart may include flight provider sections relating to respective flight providers, the flight provider sections may be arranged in accordance with ascending minimum available fare. Each flight provider section may include adjacent visible timescales aligned with the timeline wherein each timescale represents a respective time zone.

The flight selection method may further include the steps of:
  receiving a flight selection from the remote computer, the flight selection corresponding to a displayed flight representation; and
  enabling purchase of a flight ticket corresponding to the selected flight.

According to another aspect of the present invention, there is provided a web-server programmed to process flight data relating to flights to produce display data, the display data for displaying by a remote computer in accordance with a flight search query, the display data including flight representations displayed relative to a timeline, at least one flight representation being associated with more than one fare indicator.

According to another aspect of the present invention, there is provided a method for online flight selection using a computational device, the method including the step of displaying flight representations relative to a timeline in accordance with a flight search query, at least one flight representation being associated with more than one fare indicator.

The flight representations may be arranged in horizontal rows with each row including multiple flight representations. Each displayed flight representation may be interactive so that a flight selection and an associated fare can be selected using a mouse or other input device. The fare indicators may be arranged in a row of ascending values. The display data may include a chart, the chart may include flight provider sections relating to respective flight providers, the flight provider sections may be arranged in accordance with ascending minimum available fare.

According to another aspect of the present invention, there is provided a remote computer programmed to display flight representations relative to a timeline in accordance with a flight search query, at least one flight representation being associated with more than one fare indicator.

Further embodiments, preferred features and variations will be apparent from the following Detailed Description which will make reference to a number of drawings as follows.

DETAILED DESCRIPTION

Figure 1:
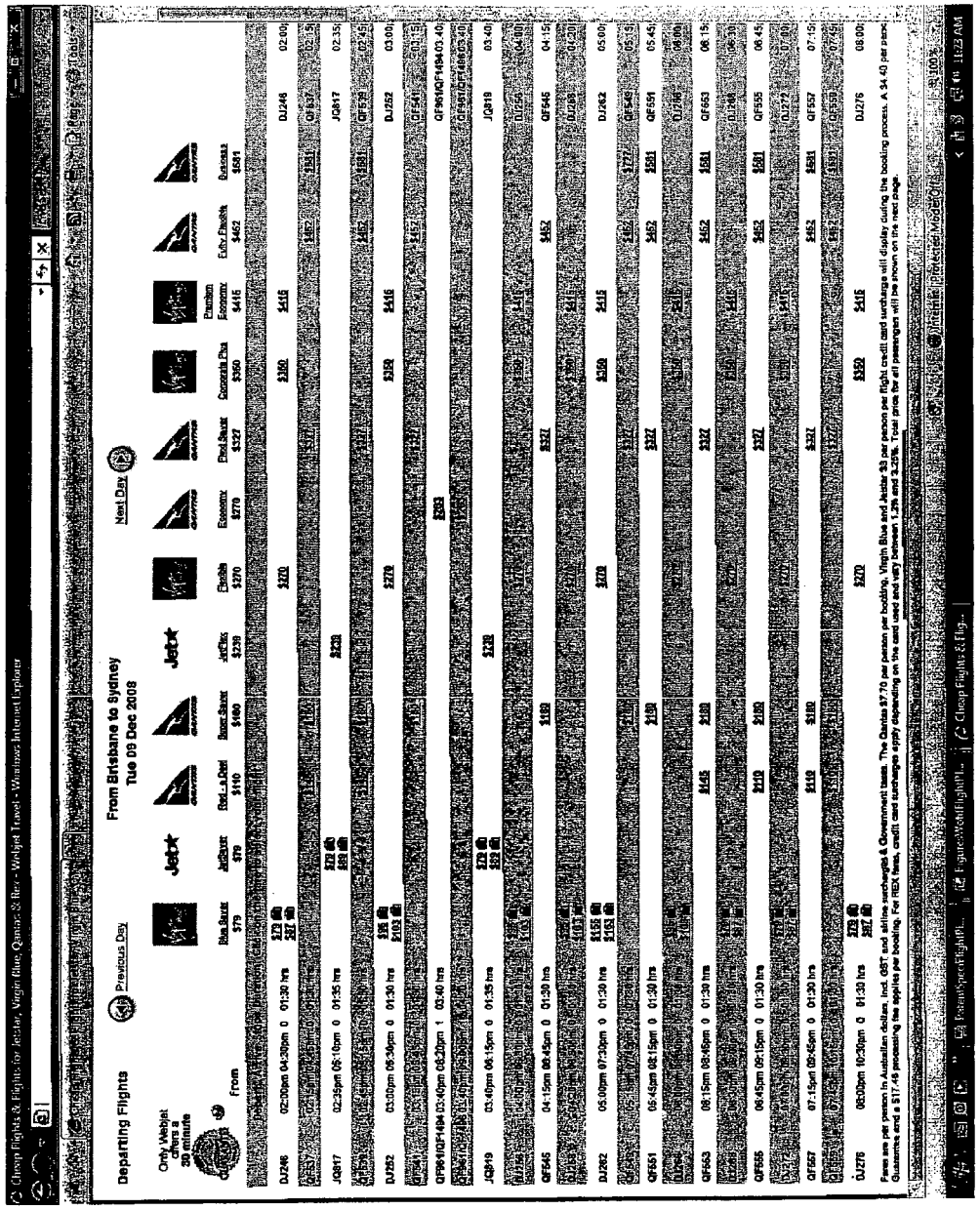
FIG. 1 is a schematic view of a known prior art flight planner web-page.
Figure 2:
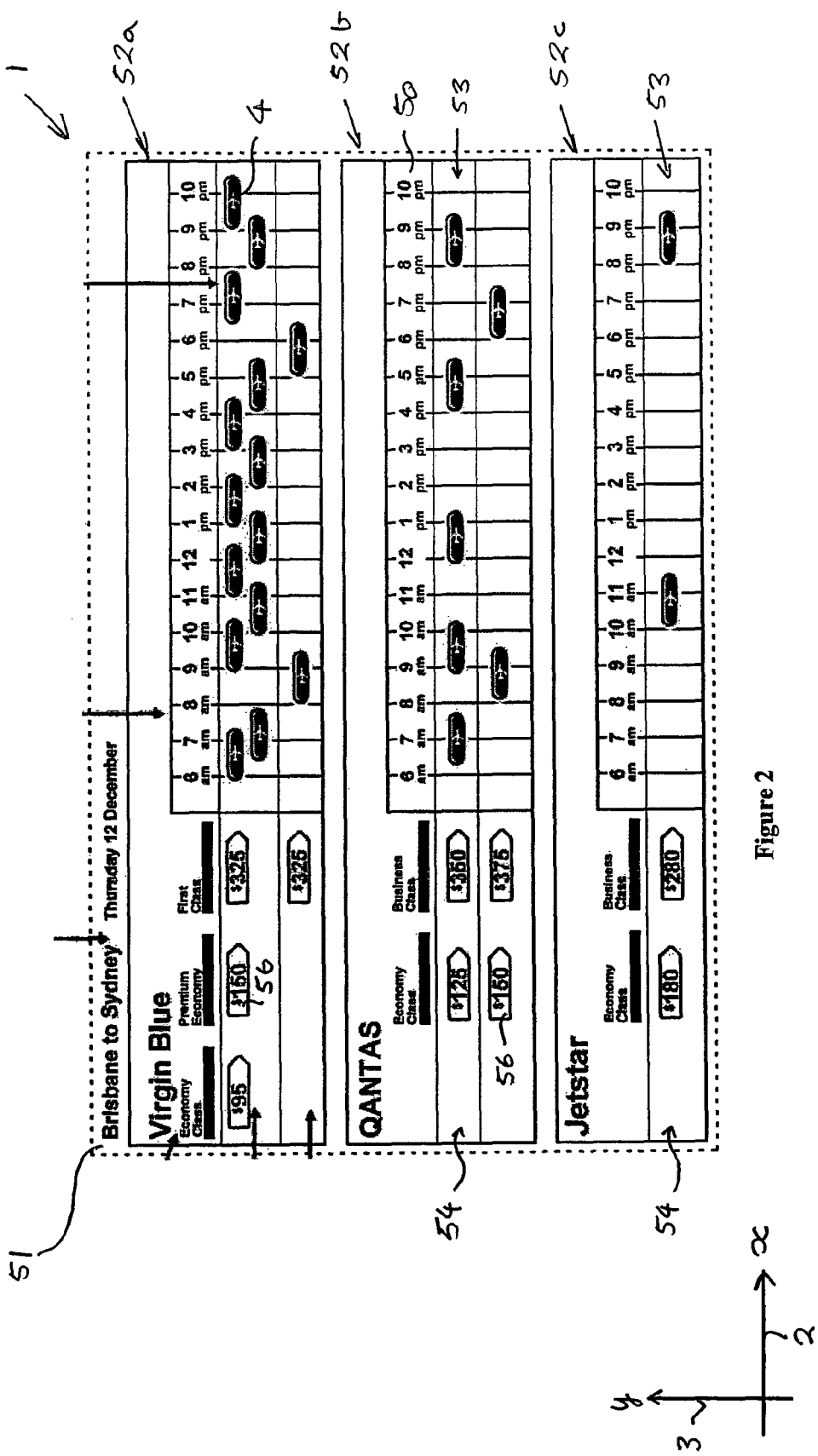
FIG. 2 is a schematic view of a flight selection web-page according to a preferred embodiment of the present invention.

Referring now to FIG. 2, there is shown a flight-planner chart 1 according to a preferred embodiment of the present invention for a particular route. The flight planner chart 1 is generated on the screen of a potential customer's computer in a manner that will be described. The screen displays display data in the form of the flight-planner chart 1 which, in turn, includes an invisible linear timeline 2 along one x-axis with the airlines names, or logos, and their fares along the other y-axis 3.

Individual flights are shown as flight windows in the form of flight bar icons 4 on the chart 1 and represent respective flights from flight providers. The position and length of each bar 4, relative to a time scale 50 aligned with the timeline 2, indicates departure time, flight duration and arrival time. Elaborating further, the beginning of the flight bar 4 is in register with a departure time on the linear timescale 50 and the end of the flight bar 4 is in register with an arrival time on the timescale 50. Accordingly, the length of the flight bar 4 represents the duration of the corresponding flight. Each displayed flight bar 4 may be interactive whereby it can be selected using a computer mouse so that the customer can select a flight corresponding to a displayed flight bar 4 when purchasing a corresponding flight ticket.

In the embodiment shown in FIG. 2, the chart 1 is constructed with multiple timescales 50 displayed along a horizontal axis and showing hourly marks for either a full day, or the part of the day that covers all flights for the chosen route (e.g., if flights for this route only occur between 6 am and 10 pm on the chosen day, then only the period from 6 am to 10 pm may be shown). As discussed in detail below, the chart 1 is produced in accordance with a customer search query relating to available flights on a given route and date, and this trip information 51 is displayed at the top of the chart 1.

The flight bars 4 are displayed on the chart 1 in spaced apart flight provider sections 52a, 52b, 52c corresponding to respective flight providers (e.g. QANTAS, Virgin Blue, etc.).

Each flight provider section 52 includes a single timescale 50 aligned with the timeline 2. Each flight provider section 52 also includes one or more flight bars sets 53 of flight bars 4. Each flight bar set 53 includes one or more ranks (e.g. rows) of flight bars 4 aligned along the timescale 50.

For a single city-to-city route, airlines typically only have between two and five distinct fare classes (e.g. economy class, business class, etc.), even when they may fly the route 15 times or more in a day. In addition, each flight class can be divided into multiple fare types (e.g. Supersaver whereby the flight cannot be changed without incurring a fee, SupersaverPlus which is more flexible whereby the flight can be changed without incurring a fee, etc.) for that class.

Each flight provider section 52 also includes one or more fare indicator sets 54 associated with respective flight bar sets 53. Each fare indicator set 54 includes one or more fares indicators 56 associated with the flight bars 4 in a corresponding flight bar set 53. Accordingly, the fares indicators 56 associated with the flight bars 4 indicate the ticket prices available on the corresponding flights. Further, those fare indicator sets 54 including multiple fare indicators 56 have the fare indicators 56 arranged in ranks of ascending price. In addition, the flight provider sections 52 are arranged down the chart 1 in accordance with ascending minimum available fare indicator 56 for the given search query. As shown in FIG. 2, the flight provider Virgin Blue has the lowest minimum available fare indicator 56 in the amount of $95, the flight provider QANTAS has the next lowest minimum available fare indicator 56 in the amount of $125, and the flight provider Jetstar has the highest minimum available fare indicator 56 in the amount of $180, Where possible, each flight bar set 53 includes a minimum number (e.g. one) of ranks of tightly packed flight bars 4 so that the chart 1 is compact. However, where displayed flight bars 4 would overlap on the chart 1 so that respective flight bars 4 would not be readily distinguishable, it is necessary to introduce another rank of flight bars 4 as shown in the top flight bar set 53 of flight provider section 52a. In this instance, a fare indicator set 54 is associated with flight bars 4 in multiple ranks within the corresponding flight bar set 53.

Figure 3:
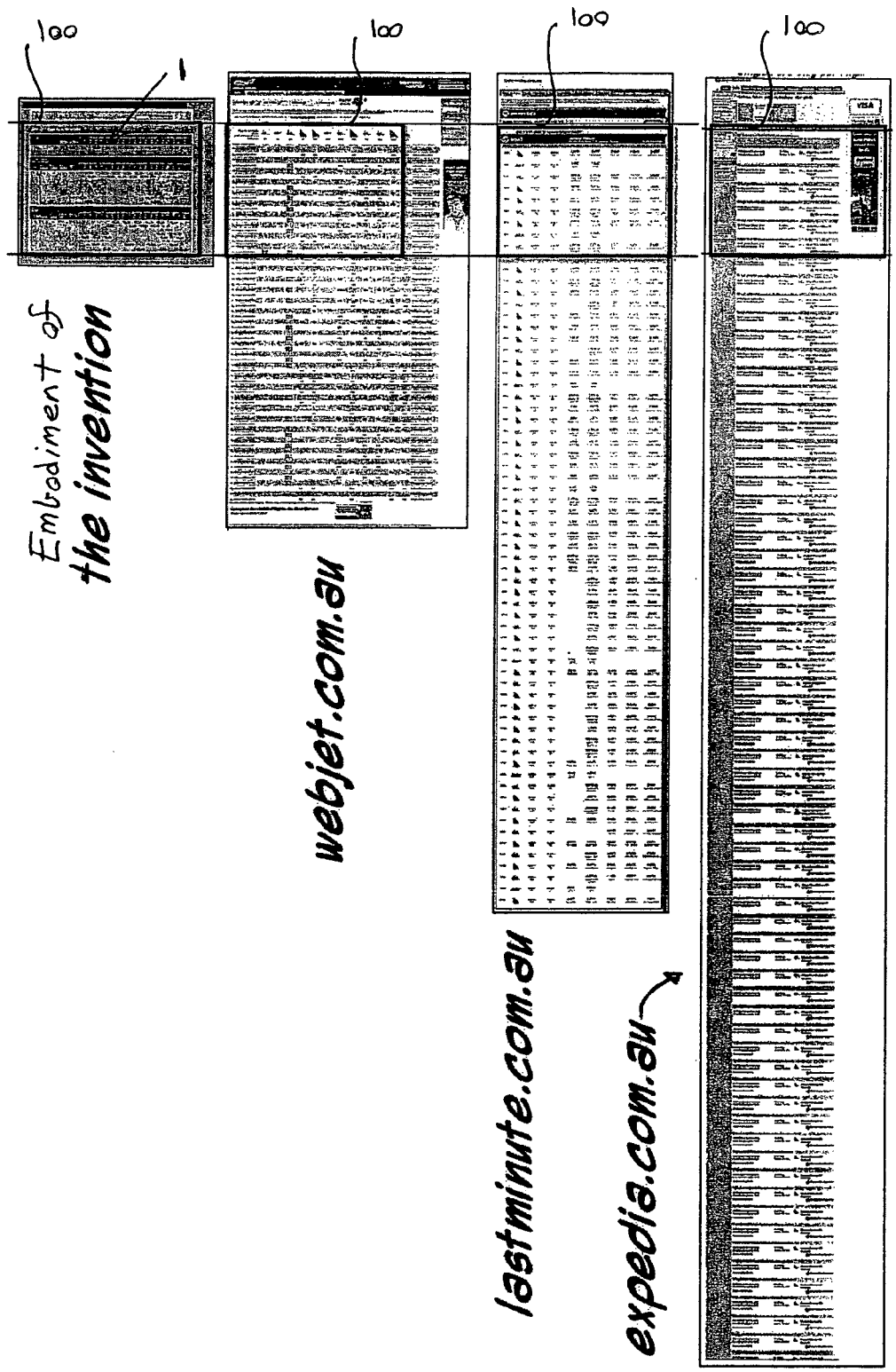
FIG. 3 shows a flight selection web-page of the preferred embodiment when compared with three analogous prior art flight planner web-pages, with all web-pages based upon and showing common flight information.

As shown in FIG. 3, the chart 1 is reduced greatly in size (e.g. from 50 rows down to 15) when compared to the typical grid display of other known flight planners such as those available at www.webjet.com.au, www.lastminute.com.au and www.expedia.com.au. FIG. 3 shows analogous flight selection web-pages of these flight planners using the same flight information. The graphical bar representation of flights of FIG. 2, with each bar 4 denoting both departure and arrival times, also results in a more compact and efficient display of the same information which is easier to visually scan and compare, and with far less text presented (instead of the hundreds of fares shown in a typical chart, only a dozen or less may be required). Also, the chart 1 of FIG. 3 can be typically displayed in its entirety on a screen 100 (having a screen resolution of 1024 pixels wide by 768 pixels high) of the customer's computer thereby obviating the need to use screen scroll bars which is otherwise required for the known flight planners.

Figure 4:
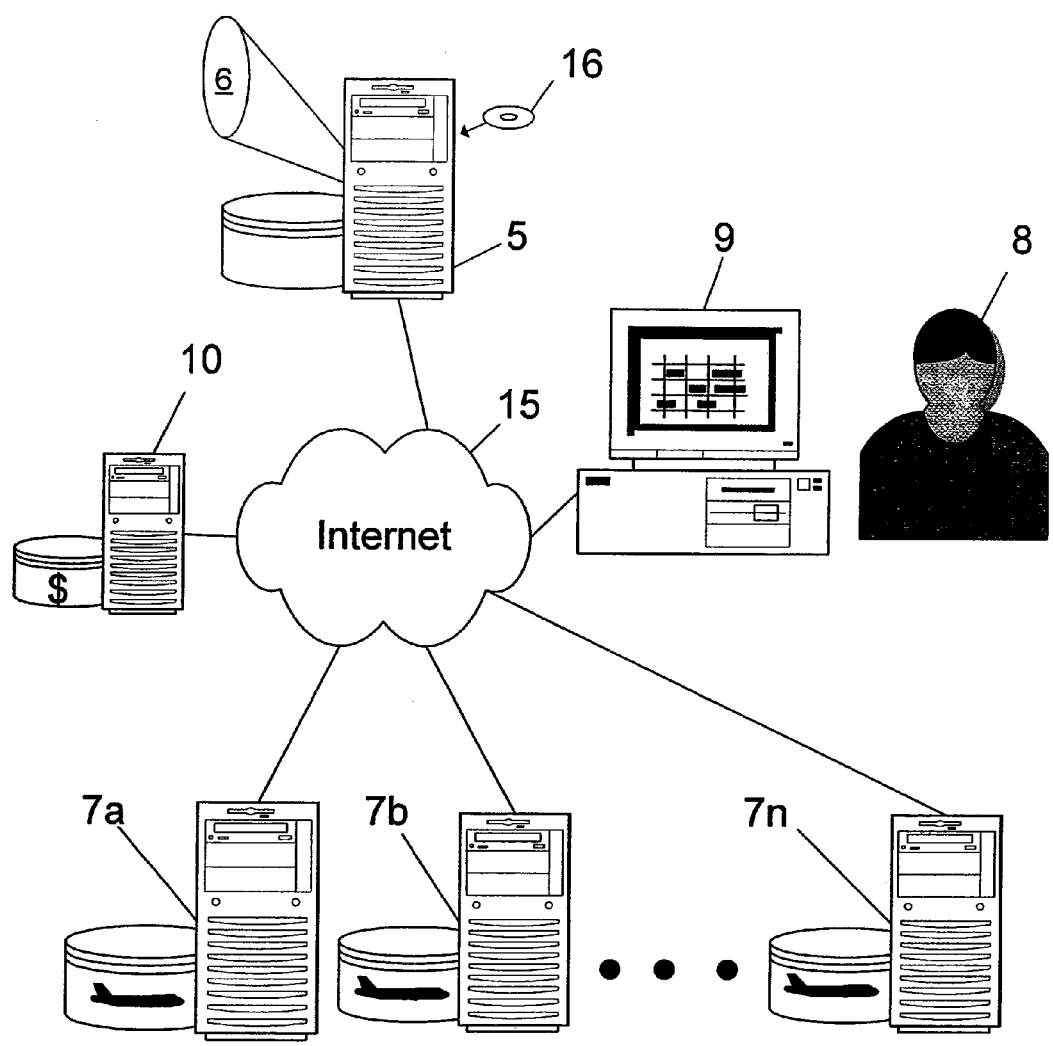
FIG. 4 is a block diagram of a flight planner system incorporating a web-server according to a preferred embodiment of the present invention.

Referring now to FIG. 4, there is depicted a block diagram of the computer system that is used to generate the display data in the form of chart 1 according to a preferred embodiment of the invention. The computer system is based around a web-server 5 (i.e. computerised device), which executes a software product 6 to construct a flight planner web-page including a flight-planner chart 1 such as the flight-planner chart of FIG. 2. The software product 6 comprises machine readable instructions provided on a suitable carrier 16, such as a magnetic or optical disk or in an integrated circuit electronic memory. One or more processors of the server 5 execute the instructions in order to implement a method according to an embodiment of the present invention that will be described shortly with reference to FIG. 5. It will be realised that the actual coding of the software is straightforward once the method that is described in relation to FIG. 5, is comprehended.

The web-server 5 communicates with a number of airline databases 7a, 7b, . . . , 7n via a connection with the Internet 15. The airline databases 7a, 7b, . . . , 7n make flight data, such as flight times, fares and availability data, accessible to the web-server 5.

A customer 8 is able to view the flight-planner web-page by means of an Internet-connected remote computer 9 running suitable web-browser software, for example Microsoft Internet Explorer, Mozilla Firefox, Opera, Chrome or the like. The customer is provided with data entry forms in the web-pages generated by the web-server 5 in order that the customer may select a desired flight, or flights, after having viewed the flight-planner chart. Once the customer has completed making flight selections and entered payment (e.g. credit card) details, the web server 5 redirects the web-browser running on remote computer 9 to a financial transaction server 10. The financial transaction server 10 is then able to prompt for the entered credit card payment details and facilitate the transfer of funds between the customer's and the airline's financial institutions.

Figure 5:
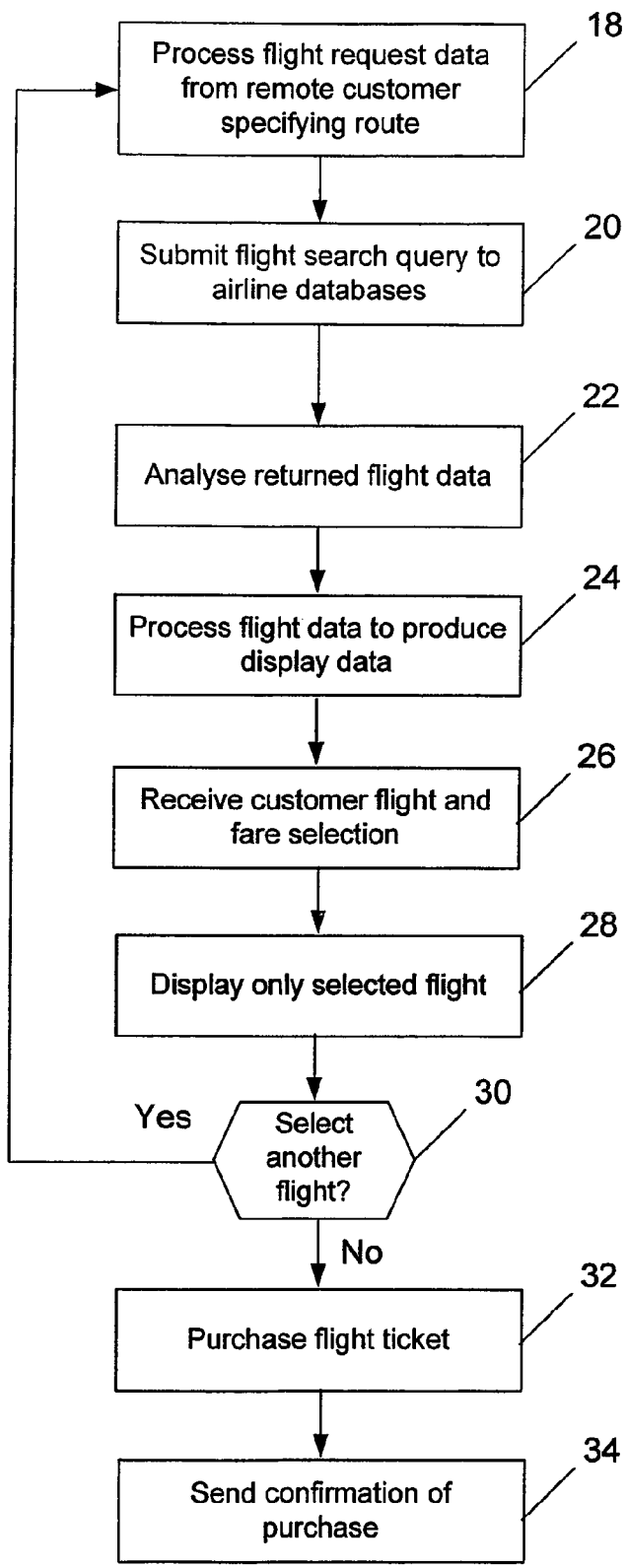
FIG. 5 is a flowchart of a flight selection method according to a preferred embodiment of the present invention.

Referring now to FIG. 5, there is depicted a flowchart of the flight selection method that is performed by the web-server 5. As previously explained, this is the method that is coded as instructions in the software product 6 that is executed by the web server 5.

Figure 6:
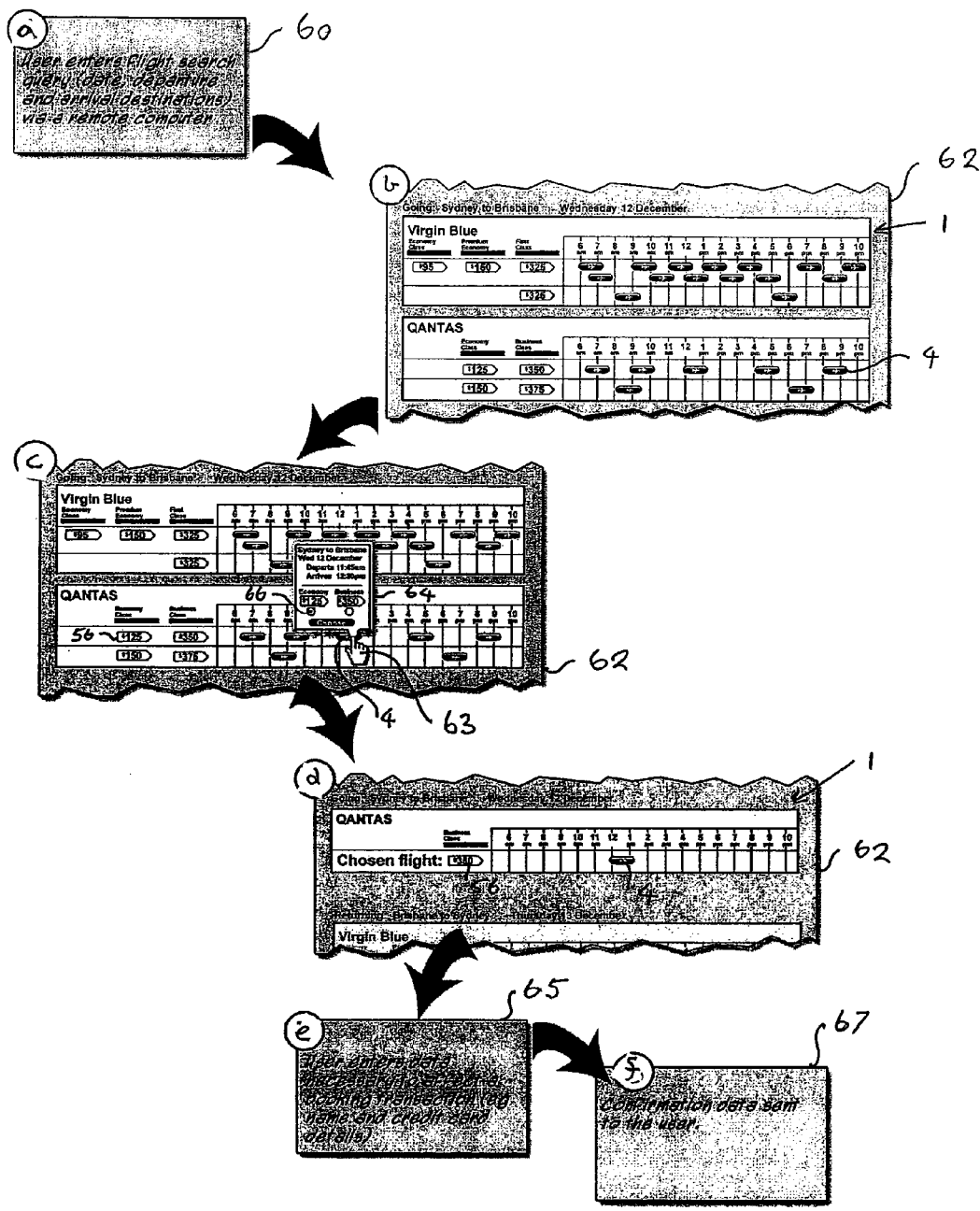
FIG. 6 shows a sequence of flight planner web-pages displayed whilst performing the flight selection method of FIG. 5.

At step 18, the web-server 5 generates a data entry web-page 60 shown in FIG. 6a, for example a web-page including a flight search query form, that is displayed in the web-browser running on the remote customer's computer 9. Once the customer 8 has filled out the flight search query form using computer 9, by specifying the route and date (and/or other flight criteria such as fare, class, number of passengers etc) of the flights of interest, the web-server processes that data to generate a flight search query for submission to the various airline databases 7a, 7b, . . . , 7n.

At step 20, the web-server 5 establishes communication with the airline databases 7 and submits the flight search query for the customer's specified route and date.

At step 22, the web-server 5 analyses the received electronic flight data that is returned from the airline databases 7. The flight data includes information such as the fare pricing and the departure and arrival times for the flight search query.

At step 24, the web-server 5 processes the received flight data to produce display data for displaying by the customer's remote computer 9 in accordance with the flight search query. The display data is in the form of a chart 1 depicted on a generated web-page 62 as shown in FIG. 6b. The construction of the flight-planner chart webpage is achieved by a software procedure that automatically generates HTML/XML code on the basis of the flight data that has been gathered for the route and date in question. The webpage is then served via the Internet to the remote customer's personal computer (PC) 9 for display to the remote customer by means of the web-browser software running on the PC 9.

At step 26, the web-server 5 receives the customer's flight selection from the remote computer 9. The web-server 5 enables selection of the corresponding displayed flight bar 4 and an associated fare with a mouse of the remote computer 9. As can best be seen in FIG. 6c, a fare option box 64 is displayed when a mouse pointer 63 is located in register with a flight bar 4. The fare option box 64 includes selection (e.g. radio) buttons 66 corresponding to respective fare indicators 56 available for the flight and which can be selected with the mouse. The flight and fare selection is made when the required selection button is selected using a mouse button.

At step 28 and as shown in FIG. 6d, the web-server 5 enables displaying on the remote computer 9 of only the flight bar 4 and fare indicator 56 corresponding to the flight selection made at step 26. Effectively, all other flight bars 4 which were not selected are no longer displayed on computer 9.

At query step 30, the web-server 5 enables querying of the customer via remote computer 9 as to whether another flight (e.g. a return flight) is to be selected. Responsive to the customer indicating with computer 9 that another flight is to be selected, the method returns to step 18. Alternatively, the method proceeds to step 32 where a ticket for the selected flight can be purchased.

At step 32, the web-server 5 enables purchase of a flight ticket corresponding to the flight(s) and fare(s) selected at step 26. Once the customer has completed making flight selections and entered payment (e.g. credit card) details into a payment window 65 (see FIG. 6e) displayed on computer 9, the web-page generated by web server 5 redirects the web-browser running on remote computer 9 to a financial transaction server 10. The financial transaction server 10 is then able to facilitate the transfer of funds between the customer's and the airline's financial institutions.

At step 34, the web-server 5 sends confirmation of the purchase of the flight ticket to the remote computer 5 in the form of an e-mail bearing an electronic ticket and receipt 67 (see FIG. 6f). In other embodiments, the confirmation may include an on-screen message or SMS message.

In compliance with the statute, the invention has been described in language more or less specific to structural or methodical features. It is to be understood that the invention is not limited to specific features shown or described since the means herein described comprises preferred forms of putting the invention into effect.

For example, the requests or queries that are sent from the server 5 to the airline databases 7 may or may not occur sequentially. In one embodiment, multiple airline databases 7 may be polled simultaneously in order to build up a result set as each airline server 7 responds with a fare/flight pair. This approach is advantageous in that it is not required for the server 5 to wait for the slowest airline server 7 before proceeding to the next. According to this further embodiment the server 5 may receive one result from a first airline database 7a, another from a second airline database 7b and then another from the first airline database 7a, another from a third airline database 7c etc, before a comprehensive picture of the departure and arrival times is settled upon.

Furthermore, the webpage code that is presented to remote customers may be built and delivered in one step or alternatively built progressively as the airline databases 7 are polled. The inventors are presently implementing the system so that the webpage code is built and delivered in one step. However, it is feasible that in an alternative embodiment the webpage code may be constructed in piecemeal fashion so that the remote customer can be given some results in a faster time frame than would be the case if a full data set were waited for before producing the webpage code.

According to the preferred embodiment, the flight window data is represented by elongate bars 4 as shown in FIG. 2. It will be realised that other representations of flights indicating departure and/or arrival times relative to the time line 2 might be used. For example, discrete icons might be used to represent departure and/or arrival times. Alternatively, arrows or other types of elongate representations, apart from or in addition to the elongate bars 4 of FIG. 2, might be employed.

In the embodiments that have been described, the remote computer system 9 has comprised a personal computer system (PC). It will be realised that embodiments of the invention encompass a method that produces display data that is suitable for displaying or rendering on other types of remote computers, for example personal digital assistants and mobile phones.

Figure 7:
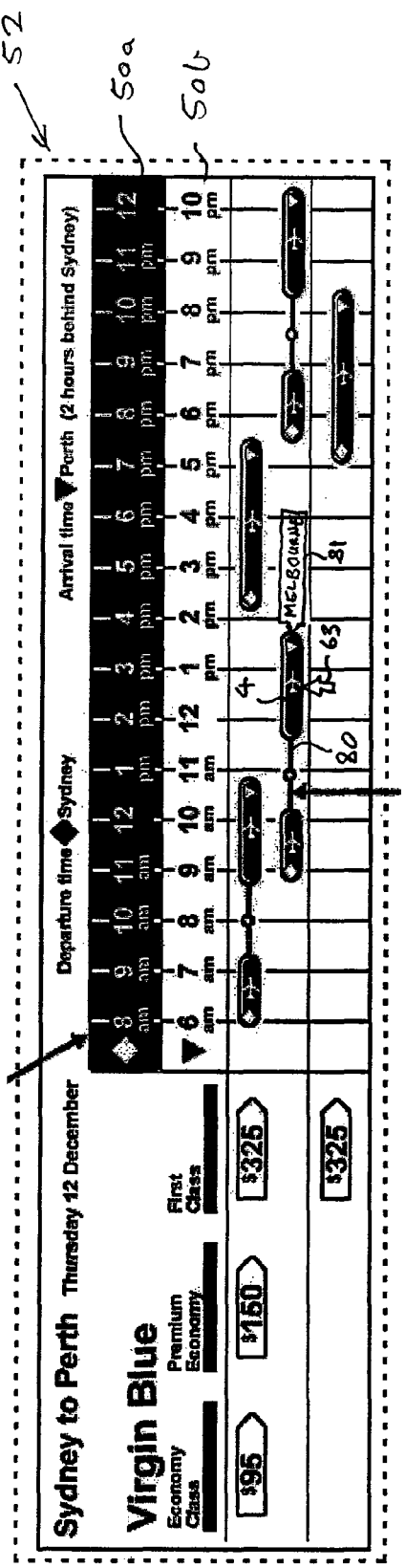
FIG. 7 shows a schematic view of a flight selection web-page according to another preferred embodiment of the present invention.

In the preferred embodiment previously described, each flight provider section 52 included a single timescale 50 aligned in parallel with the timeline 2. In an alternative embodiment shown in FIG. 7, each flight provider section 52 includes adjacent timescales 50*a*, 50*b* aligned in parallel with the timeline 2 wherein each timescale 50 relates to a respective time zone. In this manner, a first timescale 50*a* relates to a departure time zone whereas a second timescale 50*b* relates to an arrival time zone. In addition, a connection indicator 80 can be displayed between two adjacent flight bars 4 of a rank to indicate a connecting flight. The length of the connection indicator 80 corresponds to the time between adjacent flight bars 4. Responsive to the ticket purchaser locating a mouse pointer 63 in register with the later connecting flight bar 4 to the right of the connection indicator 80, the flight provider section 52 can display a pop up box 81 including the start location (e.g. Melbourne) of the connecting flight. In another embodiment, when the mouse pointer 63 or other input device is located in register with one of the adjacent flight bars 4 or the connection indicator 80, detailed time information (e.g. departure, arrival and waiting times) relating to the connecting flight can be displayed.

Each flight provider section 52 can include a single visible timescale aligned with the timeline. In an alternative embodiment, each flight provider section includes adjacent visible timescales aligned with the timeline wherein each timescale represents a respective time zone. Each timescale may be linear.

In the preferred embodiment previously described at step 26, selection of the displayed flight bar 4 and an associated fare was enabled with a mouse of the remote computer 9. In an alternative embodiment, the selection can be made with a keyboard or other like input device of the remote computer 9.

In the preferred embodiment described, the flight data was obtained from airline databases 7*a*, 7*b*, . . . , 7*n* of flight providers. In an alternative embodiment, the flight data may be instead obtained from databases of other providers such as aggregators or data distributors.

In the preferred embodiment described, the server 5 processed flight data relating to flights to produce display data for displaying by a remote computer 9. In an alternative embodiment, the server 5 merely forwards the flight data to the remote computer 9 which, in turn, processes the flight data to produce display data for displaying by the remote computer 9.

In the preferred embodiment, the method of FIG. 5 returned to step 18 if another flight was to be selected at step 30. In another embodiment, the method may instead return to step 26 if a return flight was instead initially specified at step 18.

The invention is, therefore, claimed in any of its forms or modifications within the proper scope of the appended claims appropriately interpreted by those skilled in the art.

The claims defining the invention are as follows:

1. A flight selection method executed by one or more computers, the method comprising:
    receiving with said computers a flight search query;
    generating flight data relating to flights with said computers in response to the search query;
    electronically processing, aggregating and sorting the flight data producing-display data, the display data including flight representations of available flights on a single given route to a single ultimate destination, for a single given date;
    displaying the display data in a chart on a display screen of a remote computer in accordance with a flight search query, the chart comprising flight representations representing respective flight trips for which tickets are available for purchase for the single given date with the same departure and arrival locations of the given route, the flight representations are arranged relative to a timeline in horizontal rows with at least one row including multiple flight representations where each flight representation in the same horizontal row is associated with the same fare type indicators and the fare type indicators are the available fares for each type of service, and at least one of the horizontal rows of the chart being associated with multiple fare type indicators.

2. A flight selection method as claimed in claim 1, wherein a connection indicator is displayed between two adjacent flight representations in a row to indicate a connecting flight.

3. A flight selection method as claimed in claim 2, wherein the length of the connection indicator corresponds to the time between adjacent flight representations and, when a mouse pointer or other input device is located in register with one of said adjacent flight representations or the connection indicator, information relating to the connecting flight is displayed on the display screen.

4. A flight selection method as claimed in claim 1, wherein each displayed flight representation is interactive so that a flight selection and an associated fare is selected using a mouse or other input device.

5. A flight selection method as claimed in claim 4, wherein selecting the flight selection and associated fare comprises displaying a fare option box when a mouse pointer or other input device is located in register with a flight representation.

6. A flight selection method as claimed in claim 5, wherein the fare option box includes selection buttons corresponding to respective fares and the flight selection is made when a selection button is selected.

7. A flight selection method as claimed in claim 6, further comprising displaying only the flight representation corresponding to the made flight selection.

8. A flight selection method as claimed in claim 1, wherein the fare indicators is arranged in a row of ascending values.

9. A flight selection method as claimed in claim 1, wherein the chart includes flight provider sections relating to respective flight providers, the flight provider sections being arranged in accordance with ascending minimum available fare.

10. A flight selection method as claimed in claim 9, wherein each flight provider section includes adjacent visible timescales aligned with the timeline wherein each timescale represents a respective time zone.

11. A flight selection method as claimed in claim 1, further comprising:
    receiving a flight selection from the remote computer, the flight selection corresponding to a displayed flight representation; and
    purchasing a flight ticket corresponding to the selected flight.

12. A web-server programmed to:
    receive a flight search query;
    generate flight data relating to flights in response to the search query; and process flight data relating to flights to produce display data for displaying on a display screen of a remote computer, the display data including a chart with flight representations related to available flights on a single given route to a single ultimate destination for a single given date, the displayed flight representations representing respective flight trips for which tickets are available for purchase for the given date with the same departure and arrival locations of the given route, the flight representations are arranged relative to a timeline in horizontal rows with at least one row including multiple flight representations where each flight representation in the same horizontal row is associated with the same fare type indicators and the fare type indicators are the available fares for each type of service, and at least one of the horizontal rows being associated with multiple fare type indicators.

* * * * *